United States Patent
Sun et al.

(10) Patent No.: US 11,718,078 B2
(45) Date of Patent: Aug. 8, 2023

(54) STRETCHABLE THERMAL RADIATION MODULATION SYSTEM VIA MECHANICALLY TUNABLE SURFACE EMISSIVITY

(71) Applicant: University of Connecticut, Farmington, CT (US)

(72) Inventors: Luyi Sun, Storrs, CT (US); Songshan Zeng, Willington, CT (US); Kuangyu Shen, Willington, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 263 days.

(21) Appl. No.: 17/149,333

(22) Filed: Jan. 14, 2021

(65) Prior Publication Data

US 2021/0213718 A1    Jul. 15, 2021

Related U.S. Application Data

(60) Provisional application No. 62/961,458, filed on Jan. 15, 2020.

(51) Int. Cl.
    *B32B 27/30*      (2006.01)
    *B32B 7/12*      (2006.01)
    (Continued)

(52) U.S. Cl.
    CPC .......... *B32B 27/306* (2013.01); *B32B 7/023* (2019.01); *B32B 7/06* (2013.01); *B32B 7/12* (2013.01);
    (Continued)

(58) Field of Classification Search
    None
    See application file for complete search history.

(56) References Cited

U.S. PATENT DOCUMENTS 6,538,796 B1 *   3/2003   Swanson ................ B64G 1/50
                                                   359/290
8,815,771 B2     8/2014   Chopra et al.
                   (Continued)

FOREIGN PATENT DOCUMENTS

EP           3812835 A1 *   4/2021   ......... E06B 3/6722
JP      2015052710 A      3/2015
             (Continued)

OTHER PUBLICATIONS

Currano—electrostatic switched radiator using heat flux emiss.—J.Thermophys.Heat Trans.—2008 (Year: 2008).*

(Continued)

*Primary Examiner* — John Vincent Lawler
(74) *Attorney, Agent, or Firm* — Cantor Colburn LLP

(57) ABSTRACT

Disclosed herein is a thermal radiation modulation system comprising a first low emissivity layer comprising a plurality of distributed, strain-dependent cracks, the first low emissivity layer comprising a first polymer composite layer and a first mirror-like metal layer with low emissivity covering a surface of the first polymer composite layer; a first elastomer layer bonded to the first low emissivity layer opposite to the mirror-like metal layer; and optionally a first stretchable heater, the first stretchable heater is attached to the first elastomer layer opposite to the first low emissivity layer, wherein a top surface of the first low emissivity layer comprising the mirror-like metal layer has a lower emissivity relative to the first elastomer layer. Methods of making and use of the system are further described.

19 Claims, 11 Drawing Sheets

(51) Int. Cl.
- B32B 27/28 (2006.01)
- B32B 27/18 (2006.01)
- B32B 15/082 (2006.01)
- B32B 7/06 (2019.01)
- B32B 7/023 (2019.01)
- H05B 3/10 (2006.01)
- C08J 7/04 (2020.01)
- B32B 38/10 (2006.01)
- B32B 37/24 (2006.01)
- B32B 38/00 (2006.01)

(52) U.S. Cl.
CPC ............ B32B 15/082 (2013.01); B32B 27/18 (2013.01); B32B 27/283 (2013.01); B32B 38/10 (2013.01); C08J 7/0427 (2020.01); H05B 3/10 (2013.01); B32B 2037/243 (2013.01); B32B 2038/0028 (2013.01); B32B 2255/10 (2013.01); B32B 2255/205 (2013.01); B32B 2264/1027 (2020.08); B32B 2305/345 (2013.01); B32B 2307/30 (2013.01); B32B 2311/00 (2013.01); B32B 2319/00 (2013.01); B32B 2457/00 (2013.01)

(56) References Cited

U.S. PATENT DOCUMENTS

| | | | |
|---|---|---|---|
| 10,828,876 | B2 | 11/2020 | Sun et al. |
| 2015/0218337 | A1 | 8/2015 | Studart et al. |
| 2017/0335114 | A1 | 11/2017 | Lee |
| 2018/0050524 | A1* | 2/2018 | Sun ..................... C07D 311/82 |

FOREIGN PATENT DOCUMENTS

| | | |
|---|---|---|
| WO | 2012080467 A1 | 6/2012 |
| WO | 2013093766 A1 | 7/2013 |

OTHER PUBLICATIONS

Kim—Mechano-Responsive Optical Mat. Fine Tuning strain-dependent wrinkling—IDS—2013 (Year: 2013).*
Lee—Tilted Pillars on Wrinkled Elastomers as a Reversibly Tunable Optical Window—IDS—Adv.Mat.Mat.Views—2014 (Year: 2014).*
Araki, Jun et al.; "Recent advances in the preparation of cyclodextrin-based polyrotaxanes and their applications to soft materials"; Soft Matter, vol. 3, 2007, p. 1456-1473.
Cao, C. et al., "Harnessing Localized Ridges for High-Aspect-Ratio Hierarchical Patterns with Dynamic Tunability and Multifunctionality", Advanced Materials, 2014, vol. 26, pp. 1763-1770.
Chan, E. et al., "Mechanochromic Photonic Gels" Advanced Materials, 2013, vol. 25, pp. 3934-3947.
Howell article ACS Appl. Mater Interfaces 7 3641-3646 (2015).
Kim, P. et al., "Rational Design of Mechano-Responsive Optical Materials by Fine Tuning the Evolution of Strain-Dependent Wrinkling Patterns", Advanced Optical Materials, vol. 1, pp. 381-388.
Kim, P. et al., Hierarchical folding of elastic membranes under biaxial compressive stress, Nuture Materials, Dec. 2011, vol. 10, pp. 952-957.
Lee, E. et al., "Tilted Pillars on Wrinkled Elastomers as a Reversinly Tunable Optical Windo", Advanced Materials, 2014, vol. 26, pp. 4127-4133.
Lee, S. et al. "Switchable Transparency and Wetting of Elastomeric Smart Windows", Advanced Materials, 2010, vol. 22, pp. 5013-5017.
Qu, Y. et al. Thermal camouflage based on the phase-changing material GST. Light: Science & Applications 7, 26, (2018).
Reis, P., "Folded in hierarchy", Nature Materials, Dec. 2011, vol. 10, pp. 907-909.
Salihoglu, O. et al. Graphene-Based Adaptive Thermal Camouflage. Nano Lett. 18, 4541-4548, (2018).
San-Miguel, Veronica et al; "Synthesis of novel nanoreinforcements for polymer matrices by ATRP: Tribiock poly (rotaxan)s based in polyethyleneglycol end-caped with poly(methyl methacrylate)"; Polymer, V. 50, 2009, p. 5884-5891.
Weaver, J.V.M. et al; "64. Stimulus-Responsive Water-Soluble Polymers Based on 2-Hydroxyethyl Methacrylate"; Macromolecules, 37:7, 2004, p. 2395-2403.
Wikipedia-Contributors. Emissivity, < https://en.wikipedia.org/w/index.php?title=Emissivity&oldid=916625609> (Sep. 19, 2019).
Wikipedia-Contributors. Heat flux, < https://en.wikipedia.org/w/index.php?title=Heat_flux&oldid=917585302> (2019).
Wong, H. et al., "The rheology and processing of 'dge sheared' colloidal polymer opals", Journal of Rheology (1978-present) 58, 397 (2014); doi: 10.1122/1.4862920, 14 Pages.
Xu, C., Stiubianu, G. T. & Gorodetsky, A. A. Adaptive infrared-reflecting systems inspired by cephalopods. Science 359, 1495-1500, (2018).
Yanfei, Chen et al.; "Characterizing the Viscoelastic Properties of Hydrogel Thin Films by Bulge Test", Journal of Applied Mechanics, Jun. 2017, vol. 84, p. 061005-1-6.
Yin, Jie et al.; "Biaxialiy Mechanical Tuning of 2-D Reversible and Irreversible Surface Topologies through Simultaneous and Sequential Wrinkling"; Applied Materials and Interfaces, 6, p. 2850-2857, 2014.
Yin, Jie et al; "Deterministic Order in Surface Micro-Topologies through Sequential Wrinkling"; Adv. Mater. 2012, 24, p. 5441-5446.
Zeng, S et al., PMSE: Division of Polymeric Materials Science and Engineering, 414—Stimuli Responsive Elastomer Based Hybrids with Tunable Multifunctionality, ACS National Meeting, Boston, 2015, Abstract Only.
Zeng, S. et al., "Bio-inspired sensitive and reversible mechanochromisms via strain-dependent crack andfolds", Nature Communications, Jul. 8, 2016, DOI: 10.1038/ncomms11802, 9 Pages.

* cited by examiner

STRETCHABLE THERMAL RADIATION MODULATION SYSTEM VIA MECHANICALLY TUNABLE SURFACE EMISSIVITY

CROSS-REFERENCE TO RELATED APPLICATIONS

This application claims priority to U.S. Provisional Application No. 62/961,458, filed Jan. 15, 2020, which is incorporated by reference in its entirety for all purposes.

BACKGROUND

Thermal camouflage can be achieved by controlling the emitted thermal radiation from the surface of an object thereby rendering the object effectively invisible to thermal imaging systems. However, such systems require complicated preparation procedures and specialized materials to make.

There remains a need for systems that can change their surface thermal radiation levels in a controlled manner upon applying a mechanical force, systems that are scalable, easily prepared, and suitable for use in a variety of applications.

BRIEF SUMMARY

In one embodiment, a thermal radiation modulation system comprises a first low emissivity layer comprising a plurality of distributed, strain-dependent cracks, the first low emissivity layer comprising a first polymer composite layer and a first mirror-like metal layer with low emissivity covering a surface of the first polymer composite layer; a first elastomer layer bonded to the first low emissivity layer opposite to the mirror-like metal layer; and optionally a first stretchable heater, the first stretchable heater is attached to the first elastomer layer opposite to the first low emissivity layer, wherein a top surface of the first low emissivity layer comprising the mirror-like metal layer has a lower emissivity relative to the first elastomer layer.

In another embodiment, a method of making a thermal radiation modulation system comprises providing a first polymer composite layer on a substrate, the first polymer composite layer comprising a polymer and an inorganic material; applying a layer of elastomer on a top surface of the first polymer composite layer and curing the elastomer to form a composite-elastomer assembly on the substrate; removing the composite-elastomer assembly from the substrate; applying a mirror-like metal layer on a surface of first polymer composite layer opposite to the elastomer layer; optionally attaching a stretchable heater to a surface of the elastomer layer opposite to the first polymer composite layer; and forming a plurality of cracks in the first polymer composite layer and mirror-like metal layer to result in a thermal radiation modulation system, wherein the mirror-like metal layer exhibits low emissivity relative to the elastomer layer.

In yet another embodiment, a method of using the thermal radiation modulation system comprises providing the thermal radiation modulation system; applying a tensile strain of greater than 0% to less than 200% to the system, wherein the thermal radiation modulation system undergoes a reversible and tunable change in surface thermal radiation level.

In another embodiment, an article comprising a thermal radiation modulation system disclosed herein, wherein the article is a motion detection device, a thermal encryption device, a dynamic display, or thermal camouflage.

DETAILED DESCRIPTION

Figure 1A:
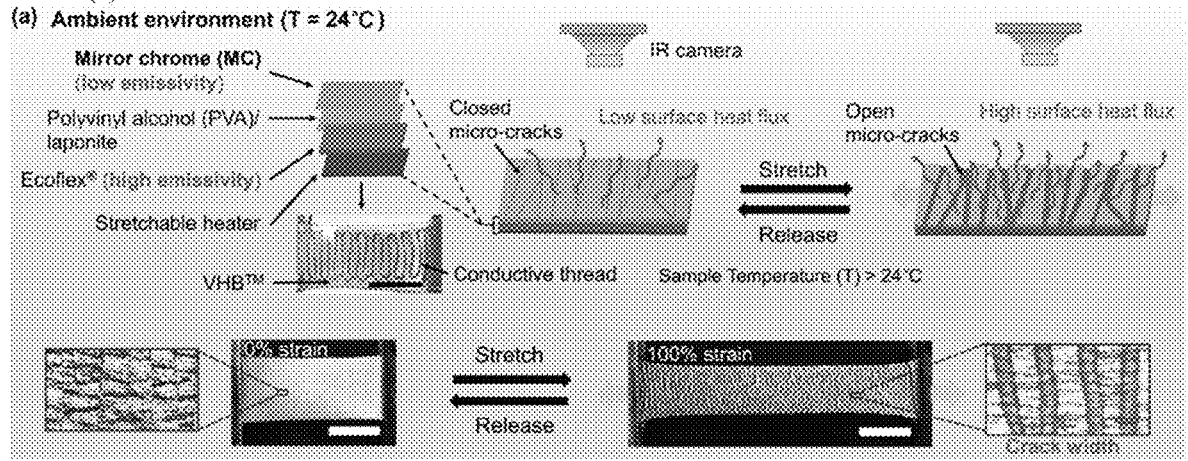
FIG. 1(a) illustrates a schematic of an exemplary thermal radiation modulation system for uniaxial strain test (TMSU); digital photo scale bar=1 cm, close up view scale bar=200 µm.
Figure 1B:
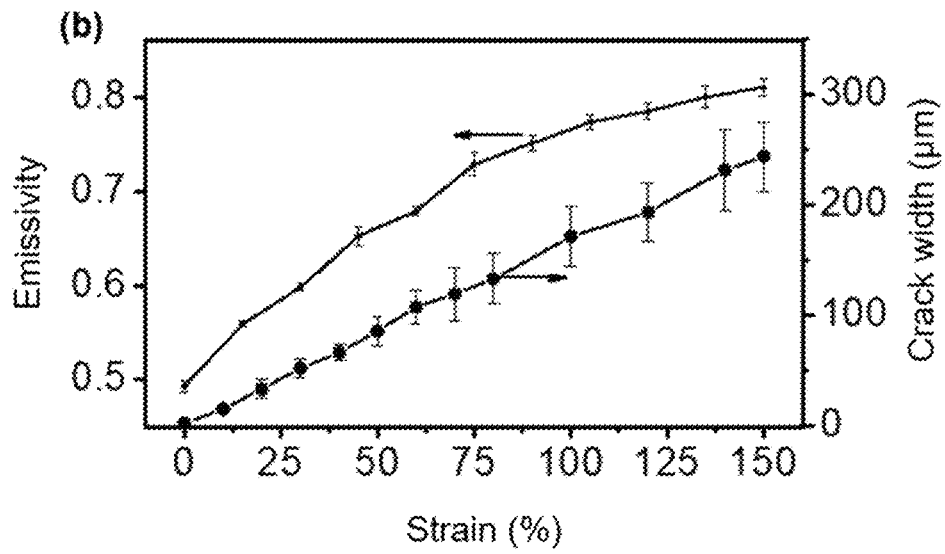
FIG. 1(b) illustrates the evolution of emissivity and crack width with strain for the TMSU with mirror chrome and laponite/PVA coating.

Disclosed herein are thermal radiation modulation systems whose surface thermal radiation can be actively modulated via mechanical means. To achieve this strain-dependent surface emissivity, a multi-layer structure comprises a rigid hard thin film surface attached to a stretchable soft substrate and optionally a stretchable heater adjacent to the stretchable soft substrate and opposite to the rigid hard thin film. The thin film has low emissivity and distributed cracks topography; it is further rigid and hard relative to the stretchable soft substrate. While the stretchable substrate has high emissivity. Thus, at released state, the surface of the heated sample has relative low emissivity, indicating low thermal radiation intensity. While under mechanical strain, the top surface exhibits open cracking surface, allowing the exposure of underlining substrate with high emissivity, resulting higher thermal radiation. Thus, the thermal radiation of this system can be instantaneously and reversibly modulated simply via mechanical means with a large modulation range. Two examples of these active thermal modulation systems are exemplified. One was designed for the operation under in-plane uniaxial strain and the other was designed for the operation under out-of-plane bulging strain. A series of applications including, finger bending monitoring, encryption device, dynamic display and thermal camouflage based on these two examples were also revealed.

All the building materials are commercially available which make them practical for mass production. The systems are easy to prepare and the thermal radiation modulation (adjustment can easily be tuned by applying a mechanical force) can be achieved by simply applying a mechanical force.

Applications of the disclosed thermal radiation modulation systems include the fields of human motion detection, thermal encryption devices, dynamic displays, and thermal camouflage.

Described herein is a thermal radiation modulation system, comprising a first low emissivity layer comprising a plurality of distributed, strain-dependent cracks, the first low emissivity layer comprising a first polymer composite layer and a first mirror-like metal layer with low emissivity covering a surface of the first polymer composite layer; a first stretchable soft substrate elastomer layer bonded to the first low emissivity layer opposite to the mirror-like metal layer; and optionally a first stretchable heater or heat source, the first stretchable heater is attached to the first elastomer layer opposite to the first low emissivity layer, or the heat source is adjacent to the first elastomer layer opposite to the first low emissivity layer. The first low emissivity layer comprising the first polymer composite layer and a mirror-like metal layer with low emissivity on top of the polymer composite layer, is rigid and hard relative to the soft elastomer layer. The low emissivity layer has a lower emissivity relative to the elastomer layer, which has a higher emissivity. Optional further layers can include adhesive layers, which may be used, for example, to attach the stretchable heater to the elastomer layer. The adhesive layer may include a stand alone material, a double sided tape, or a combination thereof. Optional further layers include one or more additional low emissivity layers, one or more additional polymer composite layers, one or more additional mirror-like metal layers, one or more additional elastomer layers, one or more additional stretchable heaters, one or more additional heat sources, or a combination thereof.

The terms "first," "second," and the like, "primary," "secondary," and the like, as used herein do not denote any order, quantity, or importance, but rather are used to distinguish one element from another.

The terms "front", "back", "bottom", and/or "top" are used herein, unless otherwise noted, merely for convenience of description, and are not limited to any one position or spatial orientation.

The polymer composite layer can be a composite comprising a polymer and an inorganic material. Exemplary polymers that can be used in the polymer composite layer include polyvinylalcohol, polyvinyl butyral, polycarbonate, a polyacrylate (such as poly(ethyl acrylate), poly(methyl acrylate), poly(methyl methacrylate)), polystyrene sulfonate, polyacrylic acid, polyethylenimine, polypropylene carbonate, polyvinylpyrrolidone, other water or organic soluble polymers, any non-crosslinked polymer, or a combination thereof.

Exemplary inorganic materials for use in the polymer composite layer include metals, metal salts, nonmetals, nonmetal salts, metalloids, metalloid salts, or a combination thereof. The inorganic can be 0-dimension particle, 1-dimension rods/tubes/fibers, 2-dimension sheets; or a combination thereof. The inorganic material can be titanium dioxide; laponite; aluminum oxide; magnesium oxide; zinc oxide; silicon oxide; Palygorskite (attapulgite); iron oxide; calcium oxide; copper oxide; tungsten oxide; montmorillonite; halloysite; kaolinite; Au; Pd; Ag; Al; or a combination thereof. The inorganic can be laponite.

The mirror-like metal layer is a layer of metal or metalloid that exhibits low surface emissivity, particularly in relation to the emissivity of the elastomer layer. The mirror-like metal layer can be a mirror chrome layer. Exemplary materials for the mirror-like layer can include metals, metalloids, or a combination thereof, specifically in a flake shape form. Exemplary materials include aluminum flake, copper flake, gold flake, iron flake, platinum flake, silver flake, zinc flake, or a combination thereof. In an embodiment, the mirror-like metal layer comprises aluminum flake.

The elastomer layer comprises an elastomer. Exemplary elastomers include polyurethane rubber, polyacrylate rubber, acrylic rubber, natural rubber, fluoroelastomers, ethylene-propylene rubber (EPR), ethylene-butene rubber, ethylene-propylene-diene monomer rubber (EPDM), epichlorohydrin rubber, acrylate rubbers, hydrogenated nitrile rubber (HNBR), silicone elastomers, polyether block amides, ethylene vinyl acetate, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), polydimethylsiloxane (PDMS), or a combination thereof. In an embodiment, the elastomer is a fluoroelastomer and the fluoroelastomer comprises a copolymer of hexafluoropropylene and vinylidene fluoride; a terpolymer of tetrafluoroethylene, vinylidene fluoride and hexafluoropropylene; perfluoromethylvinylether; or a combination thereof. In an embodiment the elastomer layer comprise a silicone rubber.

As used herein, "bonded" or "connected" means either physically or chemically connected, or a combination thereof. "Layer" does not necessarily mean there is a uniformly thick coating, or that there are no defects, holes, thickness deviations, or other imperfections.

The stretchable heater can be any suitable heat source that can raise the temperature above ambient temperature. In an embodiment, the stretchable heater is prepared from conductive thread oriented in a pattern that allows for the heater to be able to stretch and release along the direction and extent of the multi-layer structure comprising the low emissivity layer and the elastomer layer. The conductive thread can be prepared from any suitable material including metals fiber, metalloids fiber, metalloid salts fiber, conducting polymer fiber or a combination thereof. The conductive thread can be in electrical communication with an electrical device to send a current through the fibers. In an embodiment, the stretchable heater is a heating fabric or tape connected to an adjustable thermostat control device.

In another embodiment, the heat source is an external heat source not built into the thermal radiation modulation system. In an embodiment the heat source is a mammalian body, specifically a human body or at least a portion thereof, including fingers, hands, wrists, elbows, arms, legs, knees, ankles, foot, toes, neck, jaw, mouth, face, head, and the like. In another embodiment, the heat source is a machine; industrial equipment; a vehicle including a car, truck, boat, airplane, helicopter, and the like; or an electronic device.

The thermal radiation modulation systems can be used singly or in a combination of two or more units where each unit can be controlled individually, allowing different patterns to be created, for example.

The thermal radiation modulation systems can be prepared by forming a plurality of distributed, strain-dependent cracks in the low emissivity layer.

A method of making a thermal radiation modulation system comprises providing a first polymer composite layer on a substrate, the first polymer composite layer comprising a polymer and an inorganic material; applying a layer of elastomer on a top surface of the first polymer composite layer and curing the elastomer to form a composite-elastomer assembly on the substrate; removing the composite-elastomer assembly from the substrate; applying a mirror-like metal layer with low emissivity on the surface of first polymer composite layer opposite to the elastomer layer; attaching a stretchable heater to a surface of the elastomer layer opposite to the first polymer composite layer; and forming a plurality of cracks in the first polymer composite layer and mirror-like metal layer to result in a thermal radiation modulation system, wherein the first polymer composite layer and optional mirror layer exhibit low emissivity relative to the elastomer layer.

A method of using a thermal radiation modulation system comprises providing a thermal radiation modulation system having mechanically tunable surface emissivity as described herein; applying a tensile strain of greater than 0% to less than 200% to the system, wherein the thermal radiation modulation system undergoes a reversible and tunable change in surface thermal energy radiation level.

The following illustrative examples are provided to further describe the invention and are not intended to limit the scope of the claimed invention.

EXAMPLES

Characterizations: The emissivity test and thermal camera images were conducted on a FLIR E5-XT Infrared camera. The heat flux and thermocouple temperature test were characterized by a FluxDAQ Heat Flux and Thermocouple measurement system. The micro-scale optical microscopic images of all the samples were recorded on an AmScope ME 520TA optical microscope. All of the digital photos were captured with a Sony rx100m6 camera. The CIE color coordinates for the sample were obtained via analyzing the thermal camera image by the Adobe Photoshop CS4 software.

Example 1: Thermal Radiation Modulation System—In-Plane Uniaxial Strain Test (TMSU)

Figure 5:
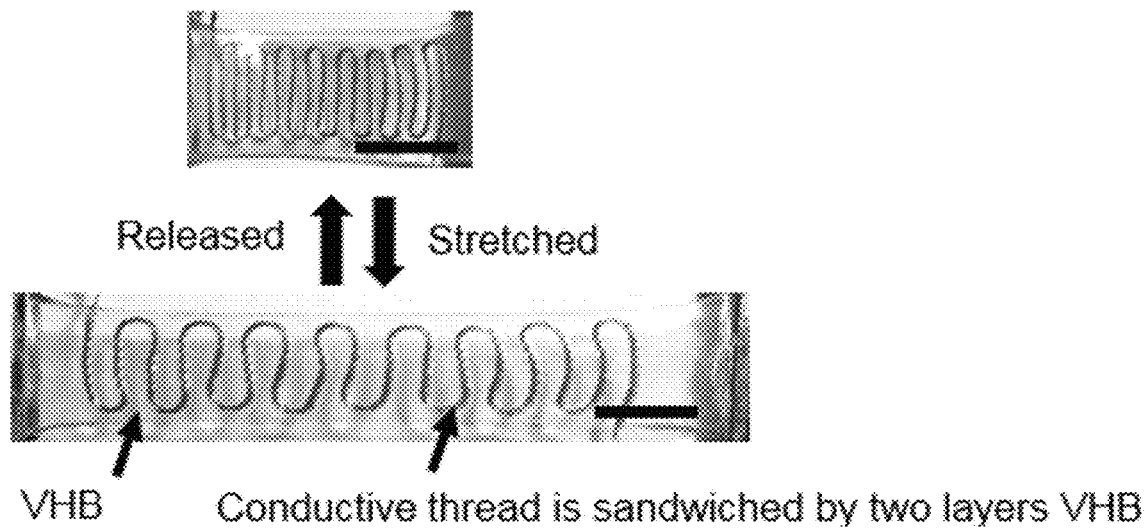
FIG. 5. is a digital photo demonstrating stretchability to 150% strain of the stretchable heater for TMSU.

The following is an exemplary preparation of the thermal radiation modulation system for the in-plane uniaxial strain test (TMSU). A layer of PVA (KURARAY POVAL™ 28-99, $M_W$ (weight average molecular weight)~145,000) and laponite (BYK Additives Inc., Gonzales, Tex., USA, mass ratio of PVA to laponite=3:2) composite films with a thickness of ca. 297 nm were cast on a pre-cleaned foundation (using a 5 mg/mL PVA/laponite aqueous solution) followed by the treatment of allyl isocyanate. The Ecoflex® 00-30 precursors (The Ecoflex® studied in this work all contains Part A and Part B with a weight ratio=1:1, Smooth-On, Inc.; Ecoflex® 00-30 is a platinum-catalyzed silicone) was cast atop the allyl isocyanate treated PVA film followed by curing at 80° C. for 2 hours (thickness of the Ecoflex® layer≈1.5 mm). The bilayer materials was then peeled off from the foundation and cut into a rectangle shape followed by sprayed coating a layer of mirror chrome (MC) (containing aluminum flakes, from Spaz Stix, Inc.; thickness≈310 nm) atop the PVA/laponite film via an airbrush style spray-gun (Master Airbrush G444-SET, equipped with a 0.5 mm needle nozzle and a Royal Mini Air Compressor, TC-20B). The multi-layered structure was then cut in a rectangle shape (length=2.7 cm, width=1.2 cm). To prepare the stretchable heater, the conductive thread spun from stainless steel fiber (purchased from Sparkfun, diameter: ca. 0.12 mm) was adhered to the VHB™ 4910 double-sided adhesive tape (size: 2.7 cm×1.2 cm) with a serpentine pattern as shown in FIG. 5. Another VHB™ 4910 double-sided adhesive tape (size: 2.7 cm×1.2 cm) attached atop the conductive thread to make a sandwich-like structure. The stretchable heater was then attached to the bottom of the multi-layered structure by silicone adhesive. The sample was then fixed on a custom-built stretcher and pre-stretched to 200% strain generate distributed cracks prior to release back to 0% strain.

Figures 2A, 2B, 2C, 2D, 2E, 2F:
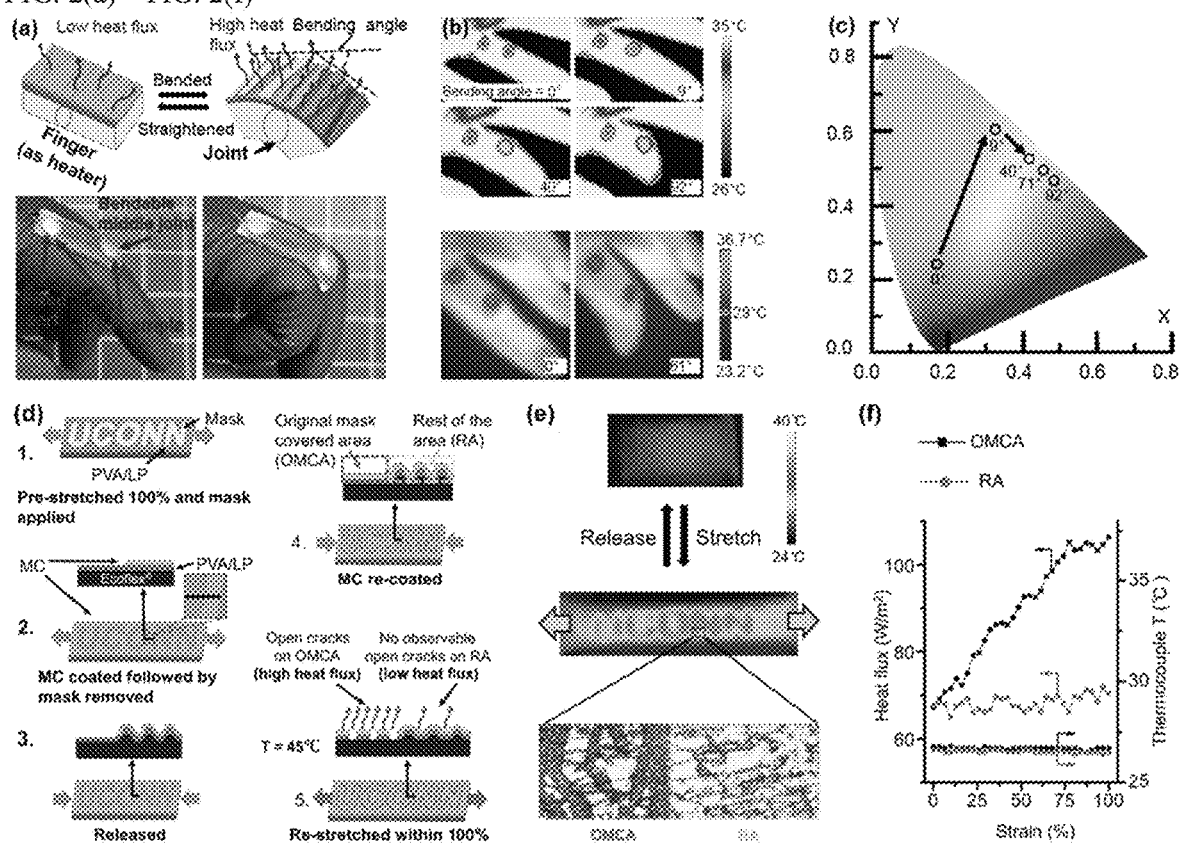
FIG. 2(a) illustrates a schematic and digital photo of TMSU for finger bending monitoring.
FIG. 2(b) illustrates the thermal camera images of TMSU for finger monitoring including thermal camera imaging in spectrum palette mode and in blue-grey duotone palette mode.
FIG. 2(c) illustrates the bending angle dependent color change in CIE 1931 xy chromaticity diagram coordinate of the TMSU for finger monitoring.
FIG. 2(d) illustrates the schematic of the TMSU for encryption device.
FIG. 2(e) illustrates the thermal camera images and corresponding optical images of the TMSU for encryption performance.
FIG. 2(f) illustrates the evolution of heat flux and thermocouple temperature as a function of strain for the encryption performance.

The following is an exemplary preparation of the TMSU for finger bending monitoring. The preparation steps for the PVA/laponite and Ecoflex® layer was the same as aforementioned procedure. The bilayer was then cutting into a size of 1.2 cm×3 cm after peeled away from foundation. A stencil mask with two hollow circle patterns (diameter=7 mm) was placed atop the PVA/laponite surface prior to the spray coating of the MC with a thickness of ca. 310 nm. Upon the removal of the stencil mask, the sample demonstrated two circle shape area with MC coating as shown in FIG. 2(a). The sample was then fixed on a custom-built stretcher and pre-stretched to 200% strain generate distributed cracks prior to release back to 0% strain. Subsequently, the sample was attached on the top of a finger part of a rubber glove, in which one circle shape area with MC coating was right atop the bendable part of the finger, while the other one was right atop the fixed/unbendable part of finger.

The following is an exemplary preparation of the TMSU for an encryption application. The preparation steps for the PVA/laponite and Ecoflex® layer was the same as aforementioned procedure. The bilayer was then cutting into a size of 2 cm×4 cm after peeled away from foundation and then attached to the top of the stretchable heater (size: 2 cm×4 cm) via silicone adhesive. As shown in FIG. 2(d), after the sample was pre-stretched to 100% strain, a "UCONN" patterned stencil mask was placed atop the PVA/laponite layer follow by spray coating a mirror chrome layer (thickness≈210 nm). Upon the removal of the stencil mask and the release of sample, the mask covered area remained uncoated by MC. After the sample released to 0% strain, another layer of MC (thickness≈150 nm) was then spray coated on the entire sample surface. The sample was then fixed on a custom-built stretcher and pre-stretched to 200% strain generate distributed cracks prior to release back to 0% strain.

Figure 6:
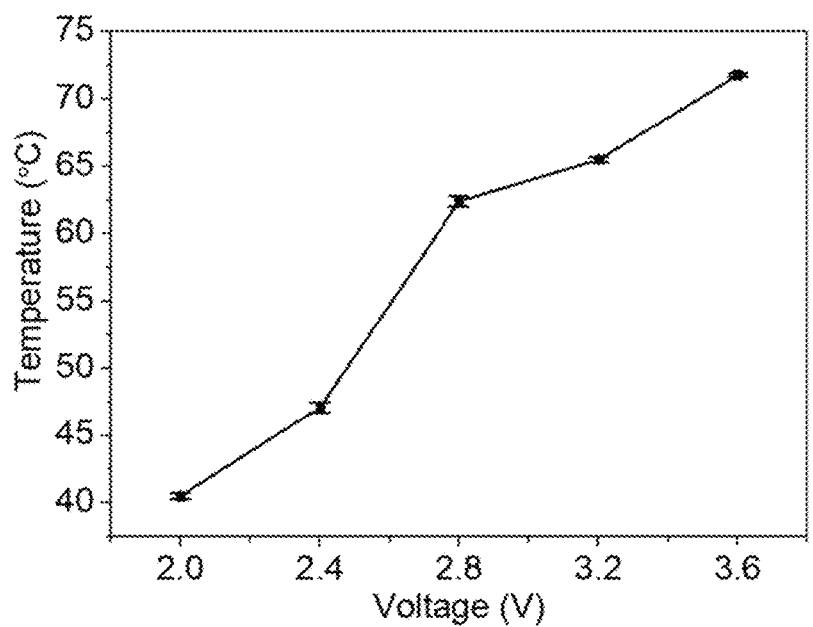
FIG. 6. illustrates the stable temperature of the stretchable heater for TMSU tested by thermocouple.
Figure 7:
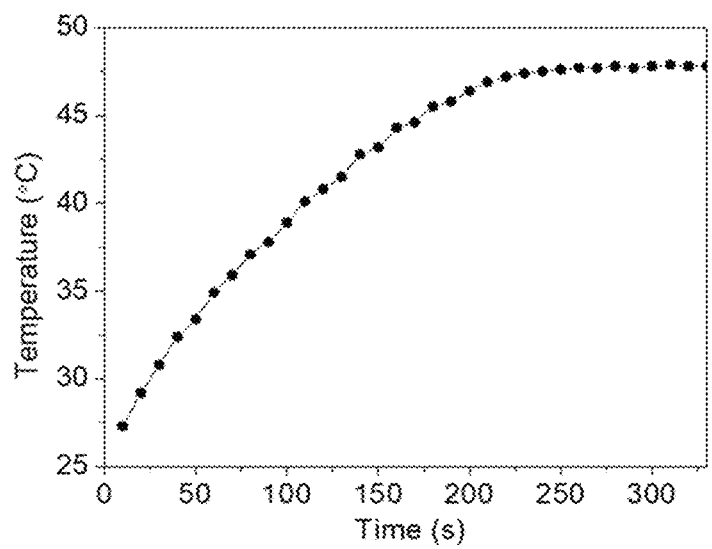
FIG. 7 illustrates a typical evolution of temperature with time for stretchable heater for TMSU at the voltage of 2.5V and current of 0.36 A.

As shown in FIG. 1, the thermal radiation modulation system for the in-plane uniaxial strain test (TMSU) was comprised of a layer mirror chrome (MC) coating (mainly containing aluminum flake) with low emissivity ($\varepsilon$=0.49), atop a polyvinyl alcohol (PVA)/laponite composite with an elastomer (Ecoflex®) soft substrate having high emissivity ($\varepsilon$=0.98). A stretchable heater made by serpentine patterned conductive thread sandwiched by VHB™ tape was attached at bottom of the Ecoflex® layer (see FIGS. 5-7 for the stretchability and performance for the stretchable heater). Once the TMSU sample was prepared, it was pre-stretched to 200% strain followed by totally released to generate distributed cracks. When the TMSU sample placed on an ambient environment (T=24° C., all the samples in this work was characterized under this ambient environment with T=24° C., unless otherwise mentioned) and heated up by the stretchable heater to above 24° C., the sample will emit thermal radiation to the external environment.

Figure 8:
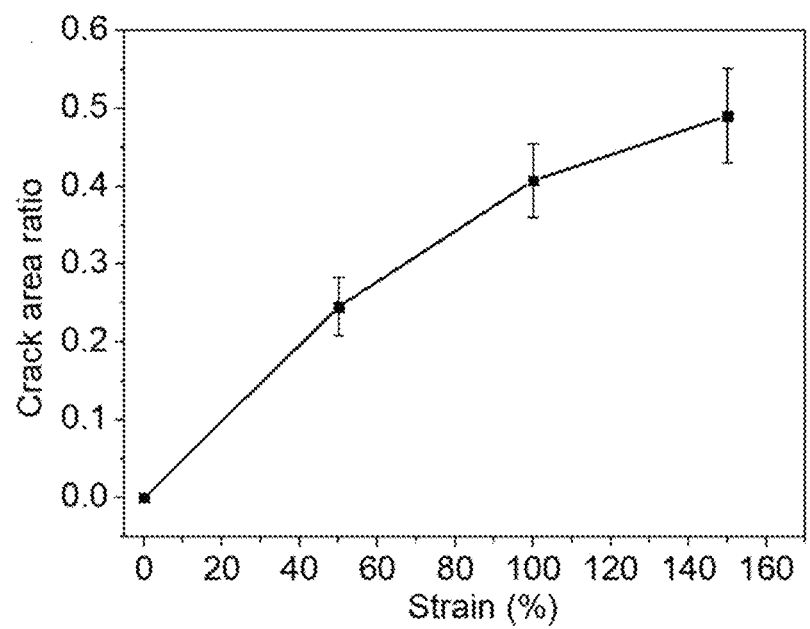
FIG. 8. illustrates the variation of crack area ratio as a function of strain (0%, 50%, 100% and 150%) based on optical microscopic (OM) images for the rigid thin film layer for TMSU.

The emissivity is defined as the ratio of the thermal radiation energy from the sample surface to that emitted from a perfect emitter (denoted as blackbody), at the same temperature and wavelength. If the heated sample is at the released state, the surface will feature with mirror chrome coating containing closed distributed cracks, the relative low surface emissivity results in low thermal radiation energy. Upon stretching the sample, the crack width of MC and PVA/laponite thin film layer increases progressively concomitant with the larger exposure area of Ecoflex® substrate with high emissivity, and the sample will exhibit higher emissivity with stronger thermal radiation energy. Therefore, by combining a low emissivity surface with a high emissivity stretchable substrate, the heated sample's surface thermal radiation energy can be dynamically and instantaneously tuned by mechanically stretching/releasing. The evolution of surface emissivity and crack width for TMSU under uniaxial strain is shown FIG. 1(b). The emissivity increased from 0.49 at 0% strain to 0.68, 0.77 and 0.81, at 60%, 105% and 150% strain, respectively, and demonstrating an emissivity modulation range up to 0.32 within a 150% strain range. The distributed cracks of the rigid thin film layer had an average width of 4.4 µm at 0% strain and the crack width increased to 33.4 µm, 132.9 µm, 243.5 µm at 20, 80, 150% strain, respectively. FIG. 8 illustrates the variation of crack area ratio as a function of strain (0%, 50%, 100% and 150%) based on optical microscopic (OM) images for the rigid thin film layer.

Figure 9:
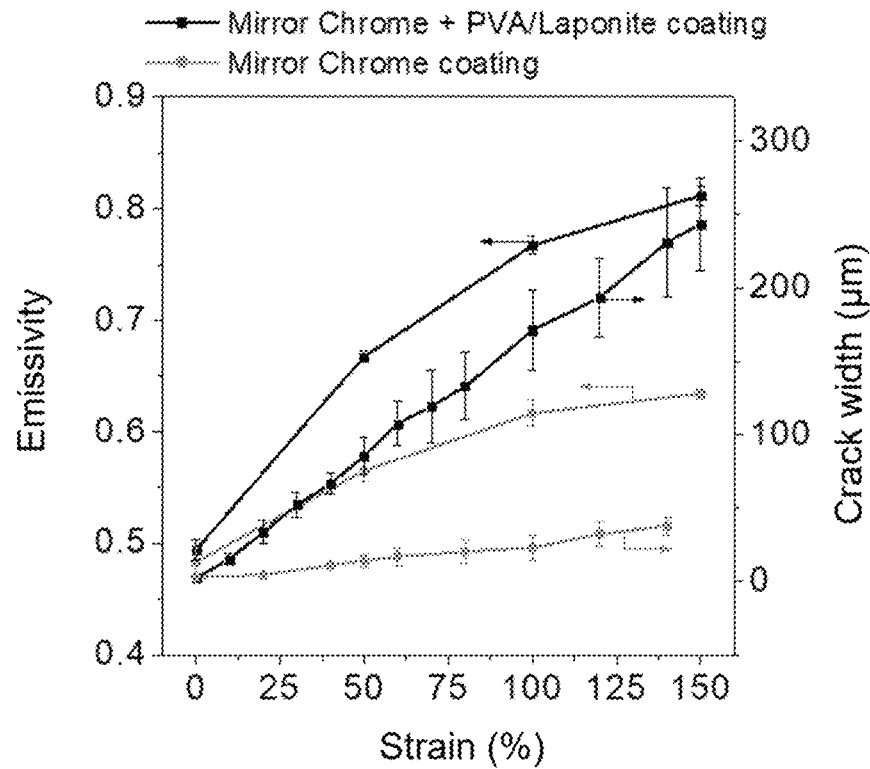
FIG. 9. illustrates the comparison of emissivity and crack width as a function of strain (strain dependent surface morphology) for TMSU with or without PVA/laponite layer.
Figure 10:
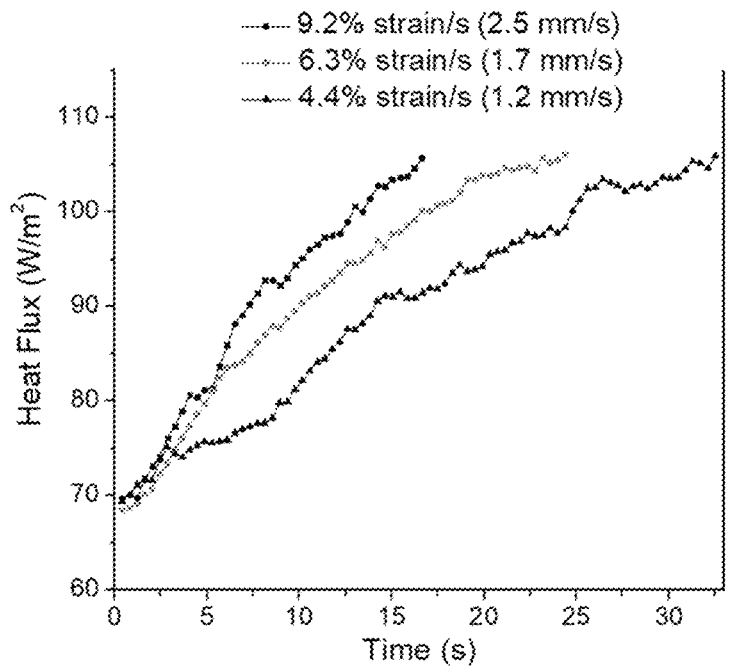
FIG. 10. illustrates the variation of heat flux for the area adjacent to the TMSU sample as a function of time under different stretching rates.

The PVA/laponite layer (thickness=297 nm) allowed for this sensitive strain-dependent surface emissivity and strong interfacial bonding for this film-substrate structure. The addition of PVA/laponite layer can effectively increase the corresponding crack spacing at released state to 259.2 µm as compared to 18.1 µm to that only with MC coating. Therefore, it dramatically enhanced the crack width value at each corresponding strain. For example, the TMSU containing MC and PVA/laponite coating exhibited crack width of 171.3 µm at 100% strain as compared to 22.9 µm for the counterpart with only MC coating at the same strain (see FIG. 9). Since the surface of PVA/laponite was treated by the allyl isocyanate during sample preparation steps, this allowed the thin film surface functioned with vinyl groups that can covalently bond to Ecoflex® substrate. The strong interface endowed the system with good durability multiple stretching/releasing cycles. Good reversibility for emissivity of TMSU under 100 stretching/releasing cycles between 0% and 100% strain was shown.

Figure 1C:
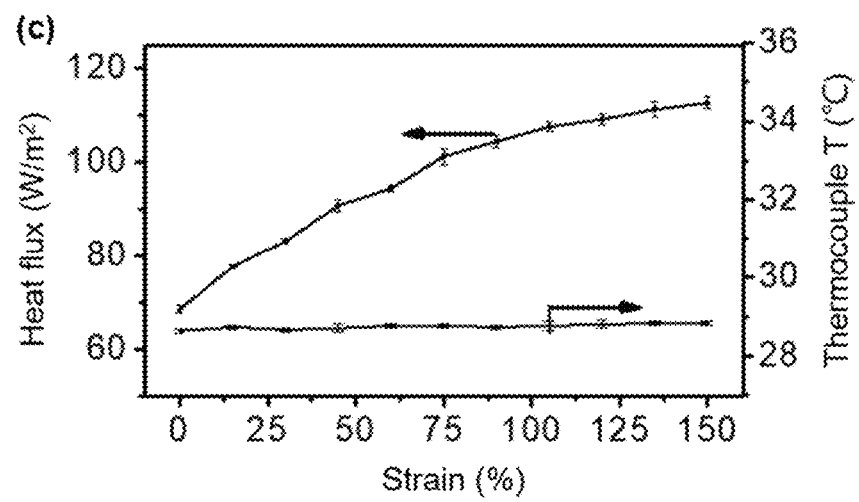
FIG. 1(c) illustrates the heat flux and thermocouple temperature for area adjacent to the TMSU sample as a function of strain (the distance of tested area to the sample surface=1 cm, size of tested area=2.5 cm$^2$).

Heat flux, which is defined as the flow of thermal energy travel through a given per unit area per unit time, containing the thermal energy flow rate from convection, conduction and radiation[3]. For a given area adjacent to top surface of the heated TMSU, the thermal energy it received is mainly affected by the thermal radiation from heated sample surface, while the thermal conduction and convection is negligible in this case. As shown in FIG. 1(c), the heat flux of the area adjacent to the heated TMSU (sample T=45° C.) (the distance of tested area to the sample surface=1 cm, size of tested area=2.5 cm$^2$) demonstrated progressively growth with the stretching strain due to the increased surface emissivity producing higher thermal radiation flow rate from 0% to 150% strain.

Figure 1D:
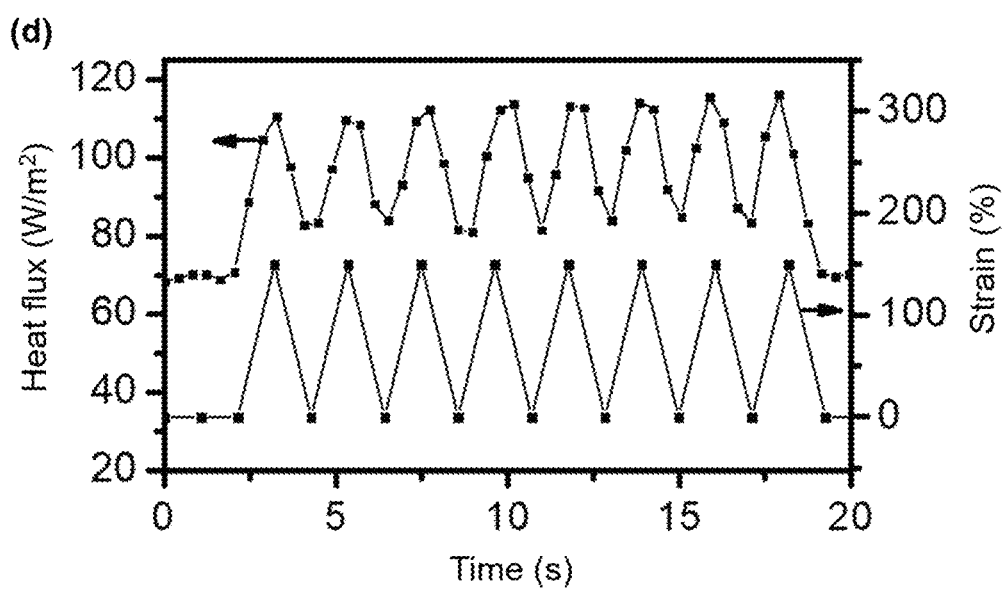
FIG. 1(d) illustrates the evolution of heat flux for area adjacent to the TMSU sample and corresponding strain level as function of time under ultra-fast stretching/releasing rate (50% strain/s).

The temperature for the area tested by thermocouple has a very small increase from 26.6° C. to 26.7° C. during this fast stretching process. As shown in FIG. 1(d), the heat flux of adjacent area to TMSU sample also demonstrated rapid, reversible and synchronized response under multiple ultrafast stretching/releasing cycles (stretching rate=50% strain/s). The response time of the evident heat flux change with strain is 0.4 s, which is already the maximum temporal resolution of the measuring equipment. Thus, this indicated that the surface thermal radiation of this system can be instantaneously modulated through mechanical force in a dynamic and reversible fashion.

The change of the surface thermal radiation can be visualized by thermal imaging camera, which renders thermal radiation (spectral range from 1.5 to 15 µm) into visible pseudo-color. The pseudo-color from the thermal camera image (TCI) for TMSU was displayed under a spectrum palette mode, and the heated sample changed from bluegreen at 0% strain, yellow at 20% strain, red at 60% strain and red-white at 100% strain. Thermal imaging analysis revealed the system demonstrated a highly sensitive pseudocolor mechanochromic response, which was also evidently manifested by using the CIE color coordinate.

As shown in FIG. 2(a), a revised TMSU is applied to sense the finger bending motion. The design is achieved by attaching the sample without stretchable heater atop the finger, and the finger with body temperature is used as the heater directly. If the sample attached right atop the bendable joint part of the finger, the bending strain (up to 30%) will stretch the sample and its surface thermal radiation raised. For comparison, the sample also attached to the fixed part of finger which is not bendable. The TCI for finger bending sensing performance is shown in FIG. 2(b). In the TCI present by spectrum palette mode, the TMSU atop the finger fixed part maintained no change under different bending degree. While the sample atop the bendable part demonstrated blue at 0° bending degree, green at 9°, green-yellow at 40° and orange-yellow at 92°, and this was also presented in CIE color coordinate shown in FIG. 2(c). The TCI for finger bending sensing was also present in another blue-grey duotone palette mode, which all detected radiation temperature ($T_{rad}$) lower than 29° C. will be displayed in blue and $T_{rad}$ above this value will be displayed in grey. Note that the temperature of an object recorded in a thermal camera is defined as the radiation temperature ($T_{rad}$), which is significantly affected by the emissivity of the object, and is not identical to the actual temperature (T) unless the object is a perfect emitter ($\varepsilon=1$).

And the sample on bendable part switch from blue to grey when bending degree was higher than 61°. Thus, this system was successfully using human finger as the heating source and able to response to the finger bending motion by emitting different intensity of thermal radiation, which can be encoded by thermal camera.

As shown in FIG. 2(d), the TMSU can also be applied as a strain responsive thermographic encryption device. In step 1, the PVA/laponite and Ecoflex® hybrid structure was pre-stretched to 100% strain and a "UCONN" patterned positive stencil mask was placed on top of the stretched sample. One MC layer was then spray coated on the sample surface followed by the removal of the mask (step 2). The sample was then totally released in step 3, followed by spray coating of another layer of MC over the entire sample surface (step 4). Thus, the original mask covered area (OMCA) only had one MC layer coated in the released state (0% strain), while the rest of the area (RA), not covered by the mask, had two MC layers coated at both 100% and 0% strain. Hence, the OMCA exhibits a topography with large open cracks that exposes the Ecoflex® substrate as stretched within 100% strain, while the substrate underneath the RA remains well shielded as stretched within the same strain range, since no open cracks are observable in this area. Note that wrinkles form on the RA at strains <100% but will not affect the shielding effect. As shown in FIG. 2e, the TCI of the heated sample was originally in a blue green color. Upon stretching to 100% strain, the "UCONN" pattern was visible in the OMCA. As shown in FIG. 2(f), the heat flux and thermocouple temperature of the OMCA and RA were tested under stretching from 0% to 100% strain at a stretching rate of 9.2% strain/s. It is evident that the heat flux increased progressively with the strain from 67.2 to 106.3 W/m² in the OMCA. While the heat flux in RA remained virtually unchanged with some tiny fluctuation. The thermocouple temperatures in both the OMCA and RA were very close and barely changed during this dynamic stretching process.

Example 2 Thermal Radiation Modulation System for Out-of-Plane Bulging Strain Test (TMSB)

Figure 11:
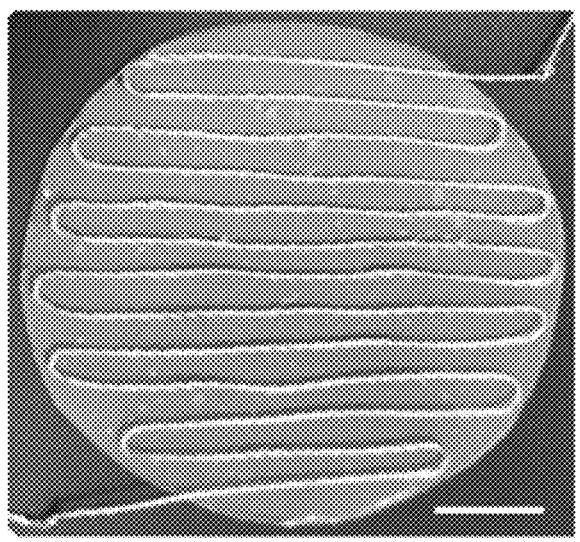
FIG. 11. illustrates the layout of the heater with a serpentine shaped conductive thread attached at the bottom of the Ecoflex® layer (scale bar=1 cm) for a TMSB system.

The following is an exemplary preparation of the thermal radiation modulation system for bulging strain test (TMSB) for dynamic display and thermal camouflage. The preparation steps for the PVA/laponite and Ecoflex® layer was the same as aforementioned procedure in Example 1. The bilayer was then cutting into a circular shape with a diameter of 5 cm after peeled away from foundation. A layer of mirror chrome (thickness≈310 nm) was then spray coated atop the PVA/laponite layer. Since the peeling process will introduce cracks perpendicular to peeling direction on the MC and the PVA/laponite rigid thin film, a pre-stretched uniaxial strain of 100% was applied in the direction perpendicular to original crack orientation followed by another 100% uniaxial strain applied on direction aligned with the crack orientation prior to released back 0% strain. Thus, two type distributed cracks vertical to each other were generated. The heater was prepared by attaching the conductive thread in a serpentine pattern atop the circular shape VHB with a polystyrene disk at the bottom (diameter=5 cm) as shown in FIG. 11. The multi-layered structure, the heater and a silicone tube connected to pumping syringe was then stacked and attached together in the fashion shown in FIG. 3(a) via silicone adhesive. In order to additional generate distributed cracks via bulging strain, the sample was pumped and bugled to a deflection of 25 mm prior to release.

Figure 3A:
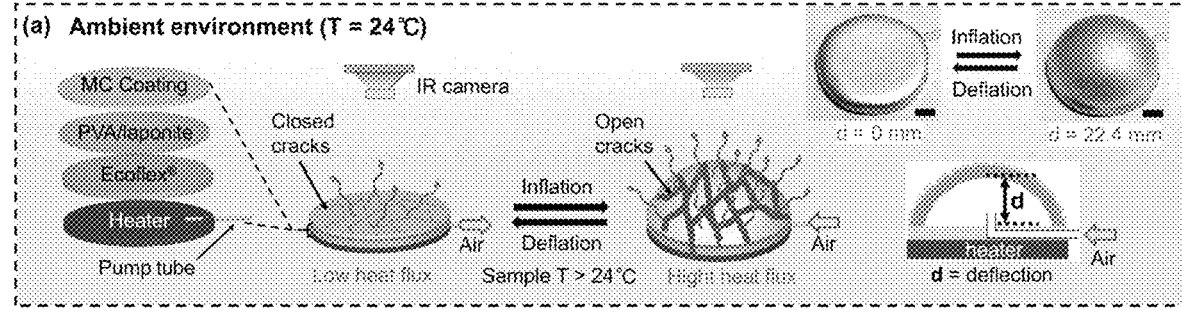
FIG. 3(a) is a schematic of the thermal radiation modulation system for bulging strain test (TMSB) (scale bar=1 cm).
Figure 3B:
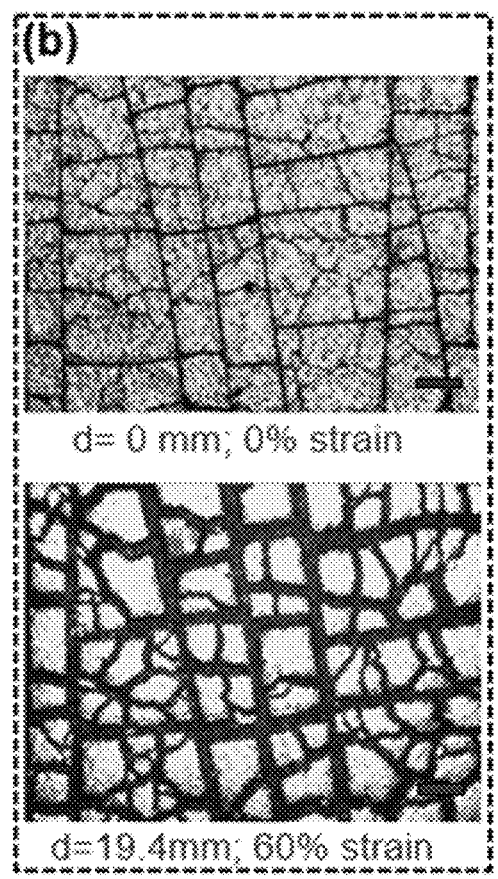
FIG. 3(b) are optical microscopic images for the TMSB top surface at deflection of 0 mm (0% strain) and 19.4 mm (60% strain).
Figure 3C:
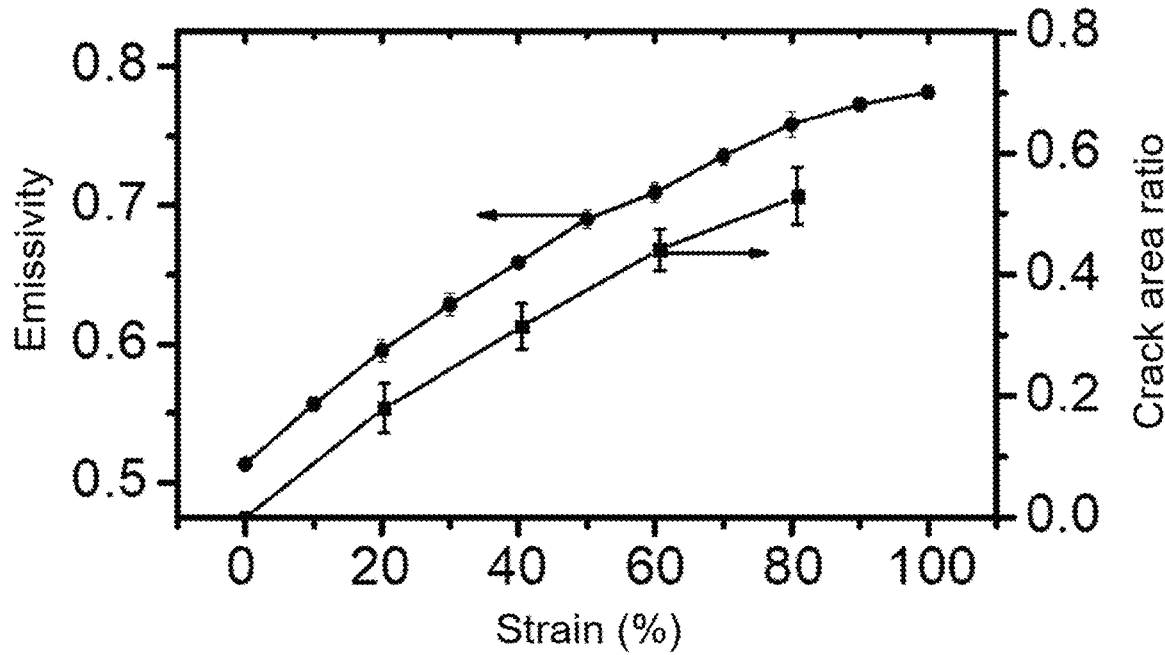
FIG. 3(c) illustrates the evolution of emissivity and crack area ratio for the TMSB with strain.
Figure 3D:
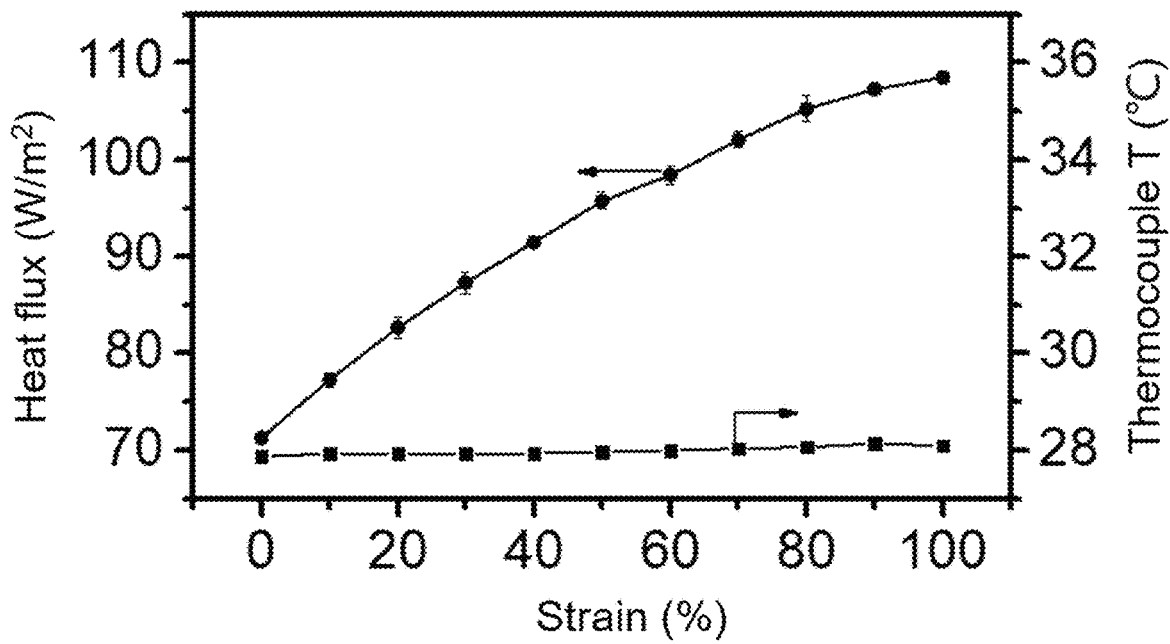
FIG. 3(d) illustrates the heat flux and thermocouple temperature of the adjacent area to the TMSB sample as a function of strain.
Figure 12:
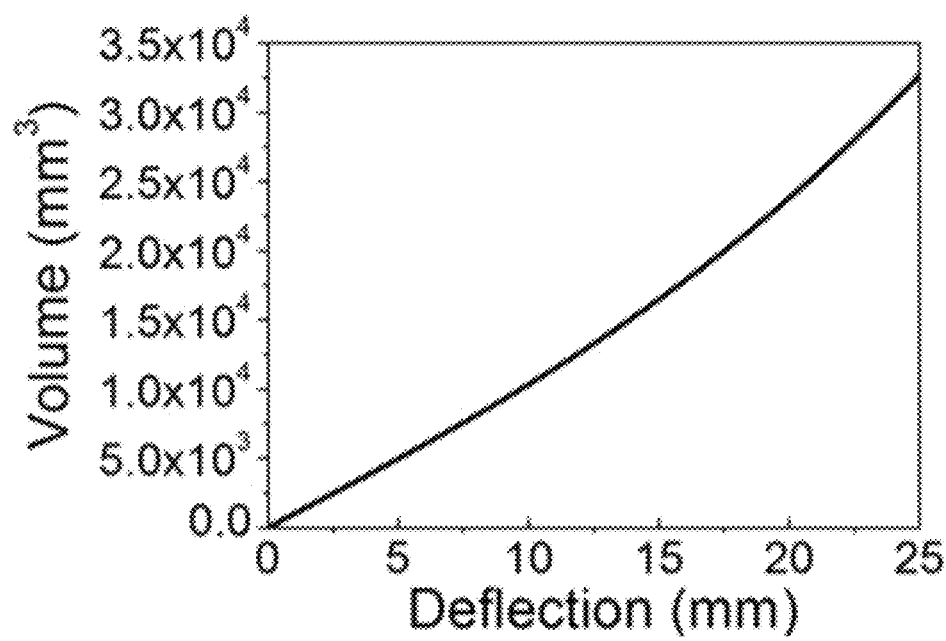
FIG. 12. illustrates the relationship of the deflection of TMSB to the volume.
Figure 13:
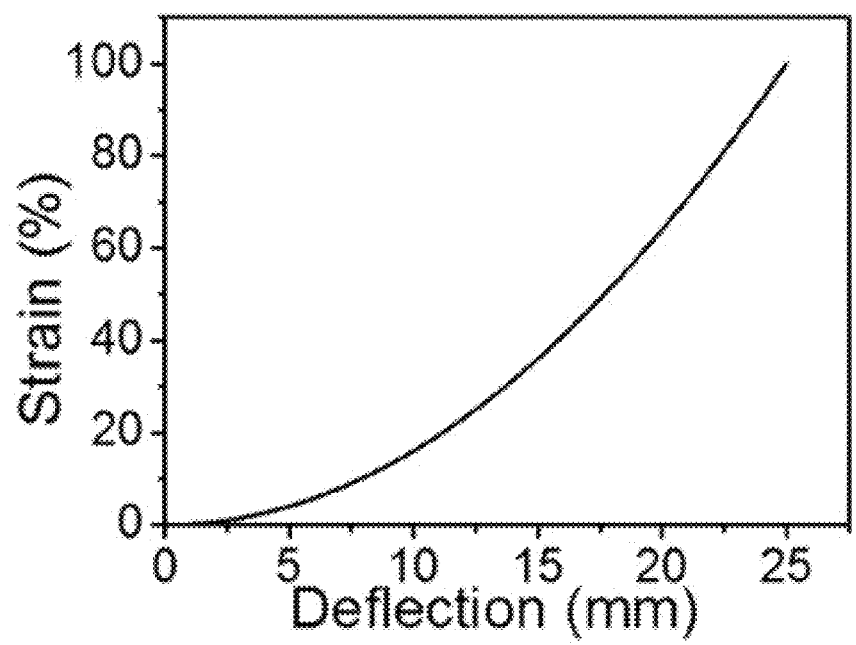
FIG. 13. illustrates the relationship of the deflection of TMSB to the strain.

The schematic of the designed structure for TMSB is shown in FIG. 3(a). The structure of TMSB had similar component as the TMSU except that it had a circular shape (diameter=5 cm) and silicone tube inserted inside for air inflation/deflation (also see FIG. 11 for the heater configuration). Without pumping air into the heated TMSB, the top surface has distributed close cracks morphology (also see FIG. 3(b)). Upon inflation, the sample experienced bulging strain and expanded into a spherical cap shape with the topography changing into opening cracks. Thus, the thermal radiation of the heated TMSB can be reversibly risen and fell off as under inflation and deflation, respectively, which can be captured by the thermal camera. The distance of the center of the bottom to the top of spherical cap of TMSB is denoted as deflection (d) (see FIG. 3a). The relation of the deflection, to the strain on corresponding spherical crown, and to volume of corresponding spherical cap are shown in FIGS. 12 and 13, respectively, which follows the well-studied spherical cap model for bulge test (See, Yanfei, C. et al. Characterizing the Viscoelastic Properties of Hydrogel Thin Films by Bulge Test. J. Appl. Mech. 84, (2017)). The evolution of emissivity of the TMSB and crack area ratio based on the OM as a function of strain is shown in FIG. 3(c). The TMSB also holds similar good reversibility under multiple inflation/deflation cycles over 100 cycles. The heat flux and thermocouple temperature of the adjacent area atop the TMSB were measured from 0 to 100% strain, respectively. As shown in FIG. 3(d), the heat flux increased progressively with the strain from 71.3 W/m² at 0% strain to 108.4 W/m² at 100% strain and the corresponding thermocouple temperature of the testing area remained stable at ca. 28.2° C.

Figures 4A, 4B, 4C:
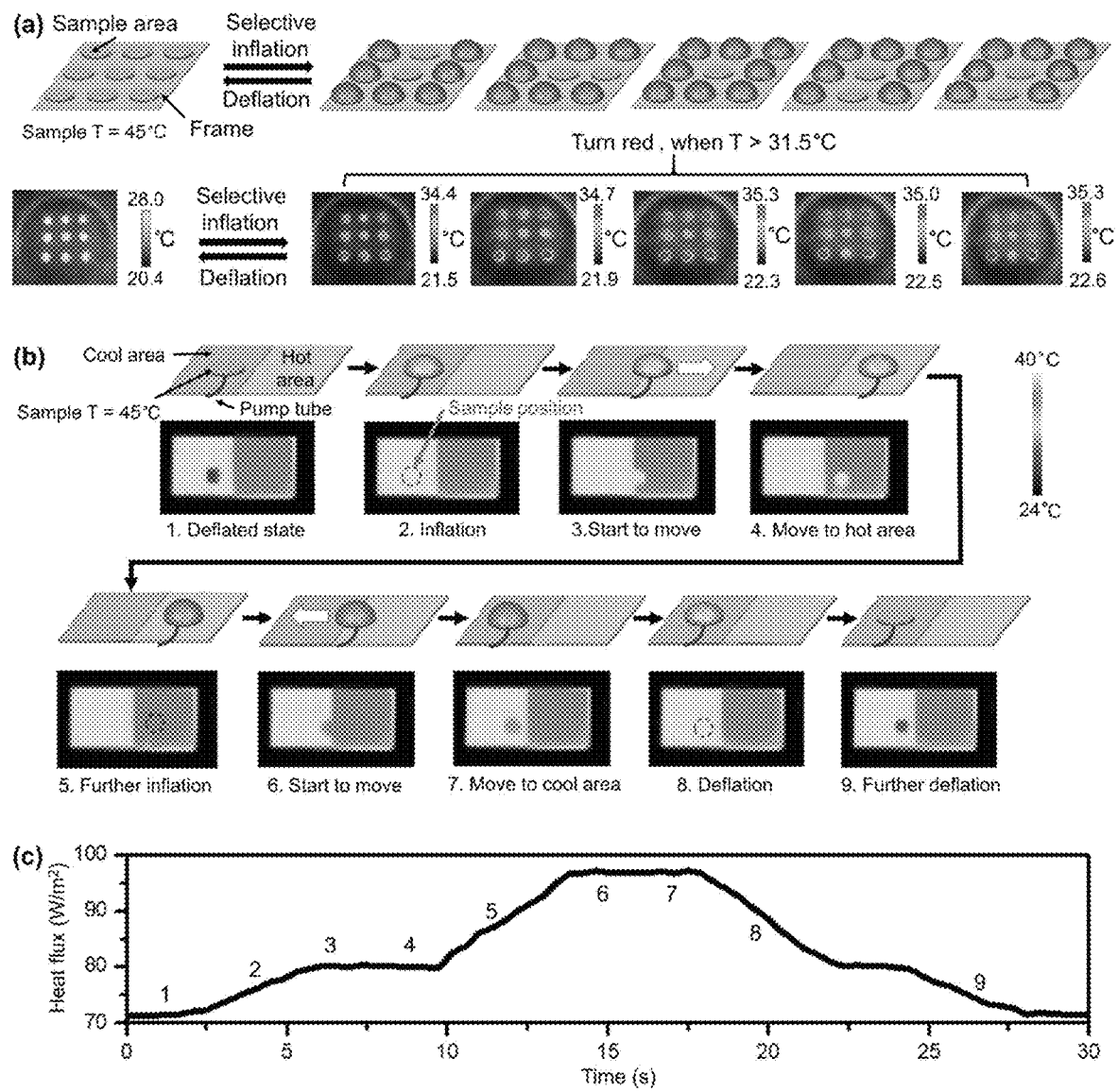
FIG. 4(a) is a schematic and performance by thermal camera imaging of TMSB arrays for dynamic display.
FIG. 4(b) is a schematic and performance by thermal camera imaging of TMSB device for thermal camouflage applications.
FIG. 4(c) illustrates the variation of heat flux of the adjacent area to the TMSB sample as function of time for the numbers of steps shown in FIG. 4(b).

This pneumatically controlled TMSB with dynamic responses and multiplexing capability can be employed in an on-demand thermographic display. As shown in FIG. 4(a), a 3×3 array of the heated TMSB was placed on a frame. Upon selectively inflating different units with five cycles of operation, the five letters "uconn" were dynamically and rapidly displayed in a chronological order. Since the TMSB can be arbitrarily moved and pneumatically controlled to tune its surface emissivity, it can autonomously conceal or reveal itself under the thermal camera. As shown in FIG. 4(b), the heated TMSB (real T=45° C.) displayed blue pseudo-color was initially placed in a relatively cool area ($T_{rad}$=32.2° C.) manifested yellow color. Upon inflation to 14.1 mm (31.8% strain), the increased emissivity of the TMSB allowed it to demonstrate the same $T_{rad}$ as the cool area, which made it totally invisible under thermal camera vision. The TMSB was then moved to the hot area ($T_{rad}$=36.4° C.), in which its yellow pseudo-color can be spotted in the hot area in red. To conceal the TMSB again, further inflation was applied to rise the $T_{rad}$ of the TMSB with a deflection of 20.1 mm (64.9% strain). The TMSB was then moved back to the cool area again, followed by a deflation to hide it again in the camera.

Finally, further deflation was conducted to reveal the TMSB in the cool area. FIG. 4(c) shows the corresponding heat flux emitted from the TMSB as a function of time for the aforenoted process. It shows a gradual increase from 71.3 W/m² at 0 s (step 1 shown in FIG. 4(b)) to 97.1 W/m² at 15 s (step 6) followed by slowly decreasing back to 71.5 W/m² at 27 s (step 9). As shown above, the TMSB demonstrates an extraordinary capability as an adaptive and autonomous soft thermal camouflage device.

The materials, methods, and uses are further illustrated by the following aspects, which are non-limiting.

Aspect 1. A thermal radiation modulation system comprises a first low emissivity layer comprising a plurality of distributed, strain-dependent cracks, the first low emissivity layer comprising a first polymer composite layer and a first mirror-like metal layer with low emissivity covering a surface of the first polymer composite layer; a first elastomer layer bonded to the first low emissivity layer opposite to the mirror-like metal layer; and optionally a first stretchable heater, the first stretchable heater is attached to the first elastomer layer opposite to the first low emissivity layer, wherein a top surface of the first low emissivity layer comprising the mirror-like metal layer has a lower emissivity relative to the first elastomer layer.

Aspect 2. The thermal radiation modulation system of Aspect 1, comprising the first stretchable heater.

Aspect 3. The thermal radiation modulation system of any one of Aspects 1-2, further comprising an adhesive layer, an additional polymer composite layer, an additional low emissivity mirror-like metal layer, an additional elastomer layer, or a combination thereof.

Aspect 4. The thermal radiation modulation system of any one of Aspects 1-3, wherein the first polymer composite layer comprises a polymer and an inorganic material.

Aspect 5. The thermal radiation modulation system of Aspect 4, wherein the first polymer composite layer comprises a 5:0.5 to 1:20 mass ratio of inorganic material: polymer, specifically about 2:3.

Aspect 6. The thermal radiation modulation system of Aspect 4 or 5, wherein the polymer is polyvinylalcohol, polyvinyl butyral, polycarbonate, a polyacrylate, poly(ethyl acrylate), poly(methyl acrylate), poly(methyl methacrylate), polystyrene sulfonate, polyacrylic acid, polyethylenimine, polypropylene carbonate, polyvinylpyrrolidone, any non-crosslinked polymer, or a combination thereof.

Aspect 7. The thermal radiation modulation system of Aspect 4 or 5, wherein the polymer is polyvinylalcohol.

Aspect 8. The thermal radiation modulation system of any one of Aspects 4-7, wherein the inorganic material is titanium dioxide; laponite; aluminum oxide; magnesium oxide; zinc oxide; silicon oxide; Palygorskite (attapulgite); iron oxide; calcium oxide; copper oxide; tungsten oxide; montmorillonite; halloysite; kaolinite; Au; Pd; Ag; Al; or a combination thereof.

Aspect 9. The thermal radiation modulation system of any one of Aspects 1-8, wherein the first elastomer layer comprises polyurethane rubber, polyacrylate rubber, acrylic rubber, natural rubber, fluoroelastomer, ethylene-propylene rubber (EPR), ethylene-butene rubber, ethylene-propylene-diene monomer rubber (EPDM), epichlorohydrin rubber, acrylate rubbers, hydrogenated nitrile rubber (HNBR), silicone elastomers, polyether block amides, ethylene vinyl acetate, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), polydimethylsiloxane (PDMS), or a combination thereof.

Aspect 10. The thermal radiation modulation system of any one of Aspects 1-8, wherein the first elastomer layer comprises a silicone elastomer.

Aspect 11. The thermal radiation modulation system of any one of Aspects 1-10, wherein the first elastomer layer has a thickness of about 0.05 to about 5 millimeters thick, specifically about 1 to about 2 mm; the first low emissivity layer has a thickness of about 10 nanometers to 350 micrometer, specifically about 250 nanometers to 500 nanometers; and the first polymer composite layer has a thickness of about 5 nanometer to about 300 micrometer, specifically about 150 nanometer to about 500 nanometers; and the first mirror-like metal layer has a thickness of about 1 nanometers to about 5 micrometer, specifically about 10 nanometers to about 100 nanometers.

Aspect 12. The thermal radiation modulation system of any one of Aspects 1 and 3-11, wherein the thermal radiation modulation system can be used with an external heat source.

Aspect 13. A method of making a thermal radiation modulation system, comprises providing a first polymer composite layer on a substrate, the first polymer composite layer comprising a polymer and an inorganic material; applying a layer of elastomer on a top surface of the first polymer composite layer and curing the elastomer to form a composite-elastomer assembly on the substrate; removing the composite-elastomer assembly from the substrate; applying a mirror-like metal layer on a surface of first polymer composite layer opposite to the elastomer layer; optionally attaching a stretchable heater to a surface of the elastomer layer opposite to the first polymer composite layer; and forming a plurality of cracks in the first polymer composite layer and mirror-like metal layer to result in a thermal radiation modulation system, wherein the mirror-like metal layer exhibits low emissivity relative to the elastomer layer.

Aspect 14. The method of Aspect 13, wherein the forming a plurality of cracks comprises pre-stretching the composite-elastomer assembly under strain and releasing the stretch to 0% strain.

Aspect 15. The method of Aspect 14, wherein the pre-stretching is conducted with in-plane uniaxial strain, in-plane biaxial strain, or a two-step in-plane uniaxial strain where the axes are perpendicular to one another.

Aspect 16. The method of Aspect 14 or 15, wherein the pre-stretching comprises applying a 50% to 250% uniaxial tensile pre-stretch to the composite-elastomer assembly; and releasing the pre-stretch to 0% strain.

Aspect 17. An article comprising the thermal radiation modulation system of any one of Aspects 1-12, wherein the article is a motion detection device, a thermal encryption device, a dynamic display, or thermal camouflage.

Aspect 18. A method of using a thermal radiation modulation system, comprises providing a thermal radiation modulation system of any one of Aspects 1-12; applying a tensile strain of greater than 0% to less than 200% to the system, wherein the thermal radiation modulation system undergoes a reversible and tunable change in surface thermal radiation level.

Aspect 19. The method of Aspect 18, wherein the application of a strain is conducted in-plane uniaxial strain or out-of-plane bulging strain.

The singular forms "a," "an," and "the" include plural referents unless the context clearly dictates otherwise. The endpoints of all ranges directed to the same characteristic or component are independently combinable and inclusive of the recited endpoint.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention can include only some of the described embodiments. Accordingly, the invention is not to be seen as limited by the foregoing description, but is only limited by the scope of the appended claims.

What is claimed is:

1. A thermal radiation modulation system, comprising:
    a low emissivity layer comprising a plurality of distributed, strain-dependent cracks, the low emissivity layer comprising a polymer composite layer and a mirror-like metal layer with low emissivity covering a surface of the polymer composite layer;
    an elastomer layer bonded to the low emissivity layer opposite to the mirror-like metal layer; and
    optionally a stretchable heater, the stretchable heater is attached to the elastomer layer opposite to the low emissivity layer,
    wherein a top surface of the low emissivity layer comprising the mirror-like metal layer has a lower emissivity relative to the elastomer layer.

2. The thermal radiation modulation system of claim 1, comprising the stretchable heater.

3. The thermal radiation modulation system of claim 1, further comprising an adhesive layer, an additional polymer composite layer, an additional low emissivity mirror-like metal layer, an additional elastomer layer, or a combination thereof.

4. The thermal radiation modulation system of claim 1, wherein the polymer composite layer comprises a polymer and an inorganic material.

5. The thermal radiation modulation system of claim 4, wherein the polymer composite layer comprises a 5:0.5 to 1:20 mass ratio of inorganic material:polymer.

6. The thermal radiation modulation system of claim 4, wherein the polymer is polyvinylalcohol, polyvinyl butyral, polycarbonate, a polyacrylate, poly(ethyl acrylate), poly(methyl acrylate), poly(methyl methacrylate), polystyrene sulfonate, polyacrylic acid, polyethylenimine, polypropylene carbonate, polyvinylpyrrolidone, any non-crosslinked polymer, or a combination thereof.

7. The thermal radiation modulation system of claim 4, wherein the polymer is polyvinylalcohol.

8. The thermal radiation modulation system of claim 4, wherein the inorganic material is titanium dioxide; laponite; aluminum oxide; magnesium oxide; zinc oxide; silicon oxide; Palygorskite (attapulgite); iron oxide; calcium oxide; copper oxide; tungsten oxide; montmorillonite; halloysite; kaolinite; Au; Pd; Ag; Al; or a combination thereof.

9. The thermal radiation modulation system of claim 1, wherein the elastomer layer comprises polyurethane rubber, polyacrylate rubber, acrylic rubber, natural rubber, fluoroelastomer, ethylene-propylene rubber (EPR), ethylene-butene rubber, ethylene-propylene-diene monomer rubber (EPDM), epichlorohydrin rubber, acrylate rubbers, hydrogenated nitrile rubber (HNBR), silicone elastomers, polyether block amides, ethylene vinyl acetate, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), polydimethylsiloxane (PDMS), or a combination thereof.

10. The thermal radiation modulation system of claim 1, wherein the elastomer layer comprises a silicone elastomer.

11. The thermal radiation modulation system of claim 1, wherein
    the elastomer layer has a thickness of about 0.05 to about 5 millimeters thick;
    the low emissivity layer has a thickness of about 10 nanometers to 350 micrometer; and
    the polymer composite layer has a thickness of about 5 nanometer to about 300 micrometer; and
    the mirror-like metal layer has a thickness of about 1 nanometers to about 5 micrometer.

12. The thermal radiation modulation system of claim 1, wherein the thermal radiation modulation system can be used with an external heat source.

13. An article comprising the thermal radiation modulation system of claim 1, wherein the article is a motion detection device, a thermal encryption device, a dynamic display, or thermal camouflage.

14. A method of using a thermal radiation modulation system, comprising:
    providing a thermal radiation modulation system of claim 1;
    applying a tensile strain of greater than 0% to less than 200% to the system, wherein the thermal radiation modulation system undergoes a reversible and tunable change in surface thermal radiation level.

15. The method of claim 14, wherein the application of a strain is conducted in-plane uniaxial strain or out-of-plane bulging strain.

16. A method of making a thermal radiation modulation system, comprising:
    providing a polymer composite layer on a substrate, the polymer composite layer comprising a polymer and an inorganic material;
    applying a layer of elastomer on a top surface of the polymer composite layer and curing the elastomer to form a composite-elastomer assembly on the substrate;
    removing the composite-elastomer assembly from the substrate;
    applying a mirror-like metal layer on a surface of first polymer composite layer opposite to the elastomer layer;
    optionally attaching a stretchable heater to a surface of the elastomer layer opposite to the polymer composite layer; and
    forming a plurality of cracks in the polymer composite layer and mirror-like metal layer to result in a thermal radiation modulation system,
    wherein the mirror-like metal layer exhibits low emissivity relative to the elastomer layer.

17. The method of claim 16, wherein the forming a plurality of cracks comprises pre-stretching the composite-elastomer assembly under strain and releasing the stretch to 0% strain.

18. The method of claim 17, wherein the pre-stretching is conducted with in-plane uniaxial strain, in-plane biaxial strain, or a two-step in-plane uniaxial strain where the axes are perpendicular to one another.

19. The method of claim 17, wherein the pre-stretching comprises applying a 50% to 250% uniaxial tensile pre-stretch to the composite-elastomer assembly; and
releasing the pre-stretch to 0% strain.

* * * * *